United States Patent
Li et al.

(10) Patent No.: US 11,573,322 B2
(45) Date of Patent: Feb. 7, 2023

(54) LASER SPEED MEASURING METHOD, CONTROL DEVICE AND LASER VELOCIMETER

(71) Applicants: NUCTECH COMPANY LIMITED, Beijing (CN); NUCTECH (BEIJING) COMPANY LIMITED, Beijing (CN)

(72) Inventors: Jian Li, Beijing (CN); Shangmin Sun, Beijing (CN); Yongming Wang, Beijing (CN); Yanwei Xu, Beijing (CN); Weifeng Yu, Beijing (CN); Yu Hu, Beijing (CN); Chunguang Zong, Beijing (CN)

(*) Notice: Subject to any disclaimer, the term of this patent is extended or adjusted under 35 U.S.C. 154(b) by 426 days.

(21) Appl. No.: 16/826,235

(22) Filed: Mar. 22, 2020

(65) Prior Publication Data

US 2020/0217963 A1 Jul. 9, 2020

(30) Foreign Application Priority Data

Mar. 21, 2019 (CN) .......................... 201910215894.9

(51) Int. Cl.
*G01S 17/58* (2006.01)
*G01S 7/48* (2006.01)
*G01S 7/481* (2006.01)
*G01S 17/08* (2006.01)

(52) U.S. Cl.
CPC ............ *G01S 17/58* (2013.01); *G01S 7/4808* (2013.01); *G01S 7/4814* (2013.01); *G01S 7/4816* (2013.01); *G01S 17/08* (2013.01)

(58) Field of Classification Search
CPC ...... G01S 17/58; G01S 7/4808; G01S 7/4814; G01S 7/4816; G01S 17/08
See application file for complete search history.

(56) References Cited

U.S. PATENT DOCUMENTS

| | | | |
|---|---|---|---|
| 5,546,188 A | 8/1996 | Wangler et al. | |
| 9,043,069 B1 | 5/2015 | Ferguson et al. | |
| 10,586,385 B2 * | 3/2020 | Moghadam | G01S 17/86 |
| 10,676,085 B2 * | 6/2020 | Smith | G06N 3/0454 |
| 11,119,192 B2 * | 9/2021 | He | G01S 7/4802 |

FOREIGN PATENT DOCUMENTS

CN 108460791 A 8/2018

* cited by examiner

*Primary Examiner* — Elias Desta
(74) *Attorney, Agent, or Firm* — Kilpatrick Townsend & Stockton, LLP

(57) ABSTRACT

The present disclosure provides a laser speed measuring method, control device and a laser velocimeter, and relates to the technical field of security inspection. The laser speed measuring method comprises the steps of: acquiring detection data within a predetermined detection angle range in a plurality of paralleled horizontal planes having different heights, from a plurality of laser rays detected towards a road extending direction in the horizontal plane; acquiring three-dimensional point cloud data according to the detection data; determining a position of a measured object in the road extending direction according to the three-dimensional point cloud data; and determining a speed of the measured object according to the position change of the measured object along the road extending direction at different timing.

17 Claims, 8 Drawing Sheets

LASER SPEED MEASURING METHOD, CONTROL DEVICE AND LASER VELOCIMETER

CROSS-REFERENCES TO RELATED APPLICATIONS

The present application claims priority to China Patent Application No. 201910215894.9 filed on Mar. 21, 2019, the disclosure of which is incorporated by reference herein in its entirety.

TECHNICAL FIELD

The present disclosure relates to the technical field of security inspection, and in particular to a laser speed measuring method, a control device and a laser velocimeter.

BACKGROUND

The laser velocimeter adopts the principle of laser ranging. The laser ranging is to determine a distance between a measured object and a test point by emitting a laser beam to the measured object, receiving a reflected wave of the laser beam and recording a time difference. The laser Doppler velocity technique is to carry out laser ranging twice with a specific time interval on the measured object to obtain a moving distance of the measured object during the time interval, thereby deriving the moving speed of the measured object.

SUMMARY

One object of the present disclosure is to improve accuracy of the laser speed measurement. According to one aspect of embodiments of the present disclosure, a laser speed measuring method is provided, comprising: acquiring detection data within a predetermined detection angle range in a plurality of paralleled horizontal planes having different heights, from a plurality of laser rays detected towards a road extending direction in the horizontal plane; acquiring three-dimensional point cloud data according to the detection data; determining a position of a measured object in the road extending direction according to the three-dimensional point cloud data; and determining a speed of the measured object according to the position change of the measured object along the road extending direction at different timing.

In some embodiments, the steps of determining the position of a measured object in the road extending direction according to the three-dimensional point cloud data comprise: splitting the three-dimensional point cloud data into areas based on a clustering algorithm to acquire point cloud areas; screening the point cloud areas according to morphological characteristics of a predetermined measured object for a point cloud area which matches with the morphological characteristics of the measured object; and determining a position of the screened point cloud area in the road extending direction.

In some embodiments, the step of splitting the three-dimensional point cloud data into areas based on a clustering algorithm comprises: acquiring coordinate values in the road extending direction and the vertical direction perpendicular to the horizontal plane as coordinates of two-dimensional point clouds from the three-dimensional point cloud data; acquiring the coordinate values in the road direction of the three-dimensional point cloud data as values of point corresponding to the two-dimensional point clouds; and clustering the two-dimensional point clouds and the values of points corresponding to the two-dimensional point clouds to acquire point cloud areas.

In some embodiments, the step of screening the point cloud areas according to morphological characteristics of a predetermined measured object comprises: acquiring a width-to-height ratio of the point cloud area to determine whether or not the width-to-height ratio of the point cloud area is within a width-to-height ratio range of the point cloud area of the predetermined measured object, wherein the width-to-height ratio range of the point cloud area of the predetermined measured object is determined according to a width-to-height ratio of the measured object, a placement height of the laser detector and a ray emission density of the laser detector; acquiring width/height information and depth information of the point cloud area; judging whether or not the width of the point cloud area is within a width range of the measured object at a current depth, wherein the width range of the measured object at the current depth is determined according to the predetermined width range and depth information of the measured object; or judging whether or not the height of the point cloud area is within a height range of the measured object at a current depth, wherein the height range of the measured object at the current depth is determined according to the predetermined height range and depth information of the measured object; and determining that the point cloud area matches with the morphological characteristics of the measured object if it is judged that the width or height of the point cloud area is within the width or height range of the measured object at the current width or depth.

In some embodiments, the step of determining a position of the screened point cloud area in the road extending direction comprises: acquiring a mean value of the coordinates of all point clouds in the point cloud area in the road extending direction; or acquiring the coordinates of the characteristic points in the road extending direction, wherein the characteristic points are extracted from the point cloud area and comprise at least one of a center of the point cloud area, a gravity center of the point cloud area, or an n-th point cloud from a position on the predetermined edge of the point cloud area of the point cloud data of the measured object towards a center direction, where n is a positive integer.

In some embodiments, the step of determining the speed of the measured object according to the position change of the measured object along the road extending direction at different timing comprises: acquiring a time interval generated from two frames of detection data spaced by a predetermined number of frames; and determining a speed of the measured object according to a difference value between the coordinates of the measured object in the road extending direction and the time interval, wherein the coordinates of the measured object are acquired from two frames of the detection data spaced by the predetermined number of frames.

In some embodiments, the two frames of detection data spaced by the predetermined number of frames are two consecutive frames of detection data in a case that the predetermined number is set as zero.

In this way, the three-dimensional point cloud data within a detection range can be obtained based on the detection data obtained by a plurality of laser detectors. The interference caused by a contour change of the object or appearance of a non-target object is avoided by obtaining the position of the measured object from identifying and processing of the three-dimensional point cloud data and by determining the speed of the measured object based on multiple frames of detection data, thus the accuracy of the laser speed measurement is improved.

According to an aspect of some other embodiments of the present disclosure, a laser speed measuring control device, comprising: a data detection unit configured to acquire detection data within a predetermined detection angle range in a plurality of paralleled horizontal planes having different heights, from a plurality of laser rays detected towards a road extending direction in the horizontal plane; a point cloud data acquiring unit configured to acquire three-dimensional point cloud data according to the detection data; a vehicle position determining unit configured to determine a position of a measured object in the road extending direction according to the three-dimensional point cloud data; and a speed determining unit configured to determine a speed of the measured object according to the position change of the measured object along the road extending direction at different timing.

In some embodiments, the vehicle position determining unit comprises: a splitting subunit configured to split the three-dimensional point cloud data into areas based on a clustering algorithm to acquire point cloud areas; a screening subunit configured to screen the point cloud areas according to morphological characteristics of a predetermined measured object for a point cloud area which matches with the morphological characteristics of the measured object; and a position determining subunit configured to determine determining a position of the screened point cloud area in the road extending direction.

In some embodiments, the splitting subunit is configured to: acquire coordinate values in the road extending direction and the vertical direction perpendicular to the horizontal plane as coordinates of two-dimensional point clouds from the three-dimensional point cloud data; acquire the coordinate values in the road direction of the three-dimensional point cloud data as values of point corresponding to the two-dimensional point clouds; and cluster the two-dimensional point clouds and the values of points corresponding to the two-dimensional point clouds to acquire point cloud areas.

In some embodiments, the screening subunit is configured to: acquire a width-to-height ratio of the point cloud area to determine whether or not the width-to-height ratio of the point cloud area is within a width-to-height ratio range of the point cloud area of the predetermined measured object, wherein the width-to-height ratio range of the point cloud area of the predetermined measured object is determined according to a width-to-height ratio of the measured object, a placement height of the laser detector and a ray emission density of the laser detector; acquire width/height information and depth information of the point cloud area; judge whether or not the width of the point cloud area is within a width range of the measured object at a current depth, wherein the width range of the measured object at the current depth is determined according to the predetermined width range and depth information of the measured object; or judge whether or not the height of the point cloud area is within a height range of the measured object at a current depth, wherein the height range of the measured object at the current depth is determined according to the predetermined height range and depth information of the measured object; and determine that the point cloud area matches with the morphological characteristics of the measured object if it is judged that the width or height of the point cloud area is within the width or height range of the measured object at the current width or depth.

In some embodiments, the vehicle position determining unit is configured to: acquire a mean value of the coordinates of all point clouds in the point cloud area in the road extending direction; or acquire the coordinates of the characteristic points in the road extending direction, wherein the characteristic points are extracted from the point cloud area and comprise at least one of a center of the point cloud area, a gravity center of the point cloud area, or an n-th point cloud from a position on the predetermined edge of the point cloud area of the point cloud data of the measured object towards a center direction, where n is a positive integer.

In some embodiments, the speed determining unit is configured to: acquire a time interval generated from two frames of detection data spaced by a predetermined number of frames; and determine a speed of the measured object according to a difference value between the coordinates of the measured object in the road extending direction and the time interval, wherein the coordinates of the measured object are acquired from two frames of the detection data spaced by the predetermined number of frames.

In some embodiments, the two frames of detection data spaced by the predetermined number of frames are two consecutive frames of detection data in a case that the predetermined number is set as zero.

According to an aspect of further embodiments of the present disclosure, a laser speed measuring control device is provided, comprising: a memory; and a processor coupled to the memory, the processor configured to perform any of the foregoing laser speed measuring methods based on instructions stored in the memory.

Such a laser speed measuring control device can obtain the three-dimensional point cloud data of the detection area based on the detection data obtained by a plurality of laser detectors. The interference caused by a contour change of the object or appearance of a non-target object is avoided by obtaining the position of the measured object from identifying and processing of the three-dimensional point cloud data and by determining the speed of the measured object based on multiple frames of detection data, thus the accuracy of the laser speed measurement is improved.

According to an aspect of still further embodiments of the present disclosure, a computer-readable storage medium is provided, on which computer program instructions are stored, and the instructions, when executed by a processor, implement the steps of any of the foregoing laser speed measuring methods.

By executing such instructions stored in the computer-readable storage medium, the three-dimensional point cloud data of the detection area can be obtained based on the detection data obtained by a plurality of laser detectors. The interference caused by a contour change of the object or appearance of a non-target object is avoided by obtaining the position of the measured object from identifying and processing of the three-dimensional point cloud data and by determining the speed of the measured object based on multiple frames of detection data, thus the accuracy of the laser speed measurement is improved.

In addition, according to an aspect of some embodiments of the present disclosure, there is provided a laser velocimeter, comprising: a plurality of laser detectors disposed in vertical direction; and any of the foregoing laser speed measuring control devices.

In some embodiments, the plurality of laser detectors disposed in vertical direction are multi-layer laser radar.

Such a laser velocimeter can obtain the three-dimensional point cloud data of the detection area based on the detection data obtained by a plurality of laser detectors. The interference caused by a contour change of the object or appearance of a non-target object is avoided by obtaining the position of the measured object from identifying and processing of the three-dimensional point cloud data and by determining the speed of the measured object based on multiple frames of detection data, thus the accuracy of the laser velocimeter is improved.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure can be understood more clearly from the following detailed description with reference to the accompanying drawings, in which.

It should be understood that the dimensions of the various parts shown in the accompanying drawings are not necessarily drawn according to the actual scale. In addition, the same or similar reference signs are used to denote the same or similar components.

DETAILED DESCRIPTION OF THE INVENTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The technical solution of the present disclosure is further described in detail through the accompanying drawings and the embodiments.

Figure 1:
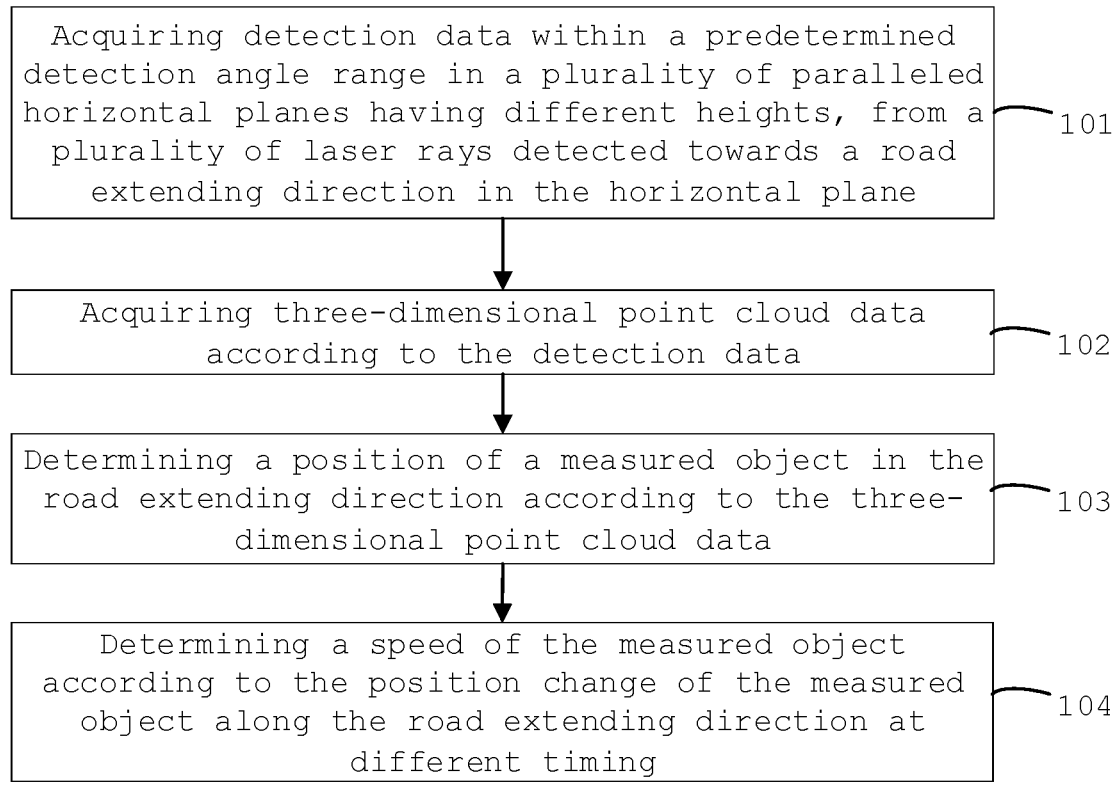
FIG. 1 is a flowchart showing some embodiments of a laser speed measuring method of the present disclosure.

A flowchart of some embodiments of the laser speed measuring method of the present disclosure is shown in FIG. 1.

In step 101, detection data within a predetermined detection angle range in a plurality of paralleled horizontal planes having different heights are acquired from a plurality of laser rays detected towards a road extending direction within a predetermined detection angle range in a plurality of paralleled horizontal planes having different heights in the horizontal plane. In some embodiments, the acquisition of the detection data at different vertical positions may be achieved by using a plurality of laser detectors that are vertically arranged and have substantially equivalent detection angle range. In another embodiment, the acquisition of the detection data in a predefined height range and within a predefined detection angle range in a horizontal direction may be achieved using multi-layer laser radar.

In some embodiments, each laser ray may be respectively used to acquire detection data in a horizontal plane corresponding to a height in which a laser detector is located, so as to determine a distance (i.e., depth) between an detected object and the laser detector within the detection angle range. In some embodiments, each laser detector has a certain detection angle range, and the detection angle range may be a sector surface centered on the laser detector. Two-dimensional detection data is acquired based on the detection angle and the depth information of the detected object within the detection angle range. Furthermore, three-dimensional detection data for the laser rays detected at different heights may be obtained by detecting the depth information of the detected objects within the sector surfaces at different heights.

In step 102, three-dimensional point cloud data is obtained according to the detection data. In some embodiments, three-dimensional coordinates of each point within the detection angle range may be obtained according to the detection height, the laser detection angle and the detected depth information, thereby obtaining the three-dimensional point cloud data.

In some embodiments, timing information may also be acquired from the detection data as a timestamp of the three-dimensional point cloud data.

In step 103, a position of the measured object in the road extending direction is determined according to the three-dimensional point cloud data. In some embodiments, the measured object may be identified according to the three-dimensional point cloud data, thereby obtaining the position of the measured object in the direction along the road extending direction.

In step 104, the speed of the measured object is determined according to the position change of the measured object along the road extending direction at different timing. In some embodiments, the speed of the measured object may be determined based on the difference of position coordinates along the road extending direction and the time interval, wherein the difference of position coordinates derives from two frames of three-dimensional point cloud data, in which a predefined number of frames spaced between the two frames correspond to the time interval.

In the related art, a laser velocimeter measures the position and speed of a vehicle in a stationary or moving state using a single-line laser detector.

If the speed of the target vehicle is measured by a single-line laser detector, the single-line laser detector may be arranged on a side of a road channel; when the target vehicle passes through the channel, a contour of the vehicle is analyzed according to the detected laser point cloud data information, characteristic point information of the target vehicle is calculated, and the position of the vehicle is determined by monitoring distance information between the characteristic point and laser detector in real time. Then, the speed of the vehicle is calculated by using a timing difference between two frames of laser point cloud data based on the determined vehicle positions.

By adopting such a scheme, in order to effectively obtain the position and speed parameters of the vehicle, it is needed to monitor the vehicle information passing through the channel, and to analyze the position and speed information of the vehicle passing through the channel, so as to provide a technical support for subsequent inspections of vehicle and carriage. Since the single-line laser detector only has one laser line, it can only measure one section of the target vehicle; moreover, since the contour of the vehicle body is not uniform, the acquired section information will change suddenly, which will result in inaccurate positioning and speed measurement information; when the vehicle body is long, since the head of vehicle is far from the tail of the vehicle, the information sparsely acquired by the laser points on the head and tail of the vehicle is inaccurate, thus there will be a large error in the calculated speed information and position information; if a non-target vehicle appears in the channel, the single-line laser detector cannot distinguish whether the object appearing in the channel is the target vehicle or not, and the entry of a target vehicle in the channel will be wrongly reported, which will result in the reducing of the feasibility of the laser velocimeter system.

By means of the method in the embodiment of the present disclosure, the three-dimensional point cloud data within a detection range can be obtained based on the detection data obtained by a plurality of laser detectors. The interference caused by a contour change of the object or appearance of a non-target object is avoided by obtaining the position of the measured object from identifying and processing of the three-dimensional point cloud data and by determining the speed of the measured object based on multiple frames of detection data, thus the accuracy of the laser speed measurement is improved.

Figure 2:
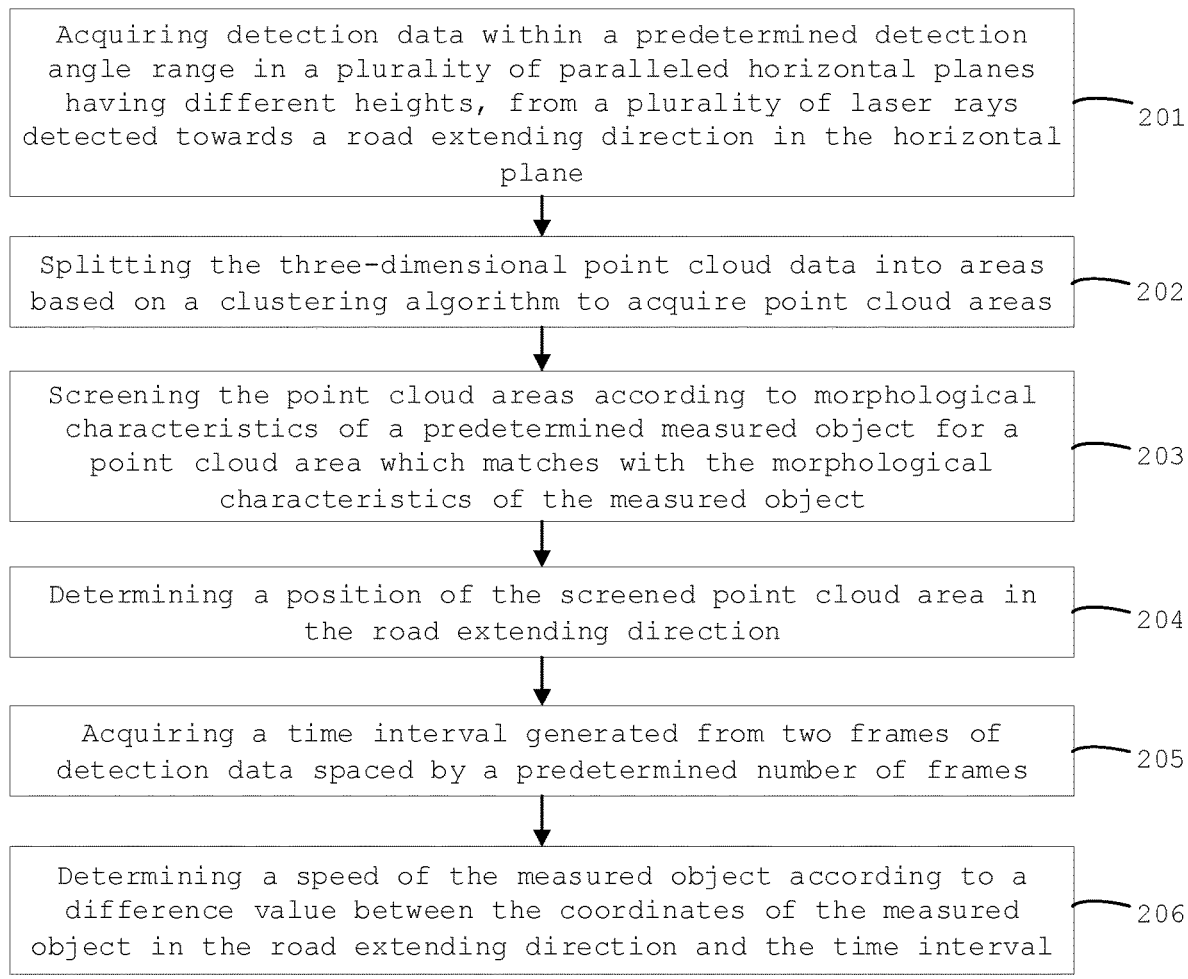
FIG. 2 is a flowchart showing some other embodiments of a laser speed measuring method of the present disclosure.

A flowchart of some other embodiments of the laser speed measuring method of the present disclosure is shown in FIG. 2.

In step 201, detection data within a predetermined detection angle range in planes which are parallel to the horizontal plane and at different heights are acquired from a plurality of laser rays detected towards an extending direction of a road in the horizontal plane.

In step 202, the three-dimensional point cloud data is split into areas based on a clustering algorithm to acquire point cloud areas. In some embodiments, from the three-dimensional point cloud data, coordinate values in the road extending direction and the vertical direction perpendicular to the horizontal plane are acquired as coordinates of two-dimensional point clouds, and then the coordinate values in the road direction may be acquired as values of points corresponding to the two-dimensional point clouds, and the two-dimensional point clouds and the values of points corresponding to the two-dimensional point clouds are clustered to acquire point cloud areas.

In step 203, the point cloud areas are screened according to morphological characteristics of a predetermined measured object for a point cloud area which matches with the morphological characteristics of the measured object. In some embodiments, the morphological characteristics may include at least one of a width-to-height ratio, a width and a height of the point cloud area.

In some embodiments, a width-to-height ratio of the point cloud area may be acquired to determine whether or not the width-to-height ratio of the point cloud area is within a width-to-height ratio range of the point cloud area of the predetermined measured object. The width-to-height ratio range of the point cloud area of the predetermined measured object can be determined in advance according to a width-to-height ratio of the measured object, the placement height of the laser detector and the ray emission density of the laser detector. Based on the placement height of the laser detector and the scanning frequency of the laser detector on the horizontal plane, a point cloud area corresponding to the real width-to-height ratio of the measured object is determined and a ratio of height coordinate to horizontal coordinate of the determined point cloud area is taken as the width-to-height ratio of the point cloud area of predetermined measured object.

In some embodiments, the width and depth information of the point cloud area may be acquired, and in consideration of the characteristic that an object looks larger when being seen nearer within detection range, a predetermined width range of the measured object at a current depth is determined according to the width range and depth information of the measured object, thereby it is judged whether or not the width of the point cloud area is within the predetermined width range of the measured object at the current depth. In addition, similar operations and determinations can be made with respect to the parameter representing the height.

In some embodiments, for vehicle detection, the ranges of width-to-height ratio, height or width of the vehicles may be pre-stored based on existing vehicle specifications and standards, for screening the point cloud data.

If it is determined that the point cloud area matches with the morphological characteristic screening requirements, the point cloud area data is determined to be the detection data of the measured object, and step 204 is executed.

In step 204, a position of the screened point cloud area in the road extending direction is determined.

In some embodiments, coordinate of the point cloud area in the road extending direction may be a mean value of the coordinates of all point clouds in the point cloud area in the road extending direction. In some other embodiments, characteristic points may be extracted from the point cloud area, and then the coordinates of the characteristic points in the road extending direction may be taken as the coordinates of the measured object in the road extending direction. In some embodiments, the characteristic points comprise at least one of a center of the point cloud area, a gravity center of the point cloud area, or an n-th point cloud from a position on the predetermined edge of the point cloud area (e.g., a middle point of the left edge, a middle point of the inferior edge, an m-th point from left to right of an upper edge, etc., where m is a positive integer) of the point cloud data of the measured object towards a center direction, where n is a positive integer.

In steps 205 to 206, the above steps 202 to 204 are performed based on two frames of detection data spaced by a predetermined number of frames, wherein each time the laser detector completes scanning within the detection angle range, one frame of detection data is generated. a time interval is determined by acquiring the timestamps of two frames of point cloud data. The coordinates of the measured object in the road extending direction are determined respectively based on the processing results of the steps 202 to 204, thereby a difference value of the coordinates is obtained.

In some embodiments, in order to prevent the detection angle of the object from changing greatly due to too fast moving speed of the measured object, a predetermined number may be set as zero, and the two frames of point cloud data spaced by the predetermined number of frames are two consecutive frames of point cloud data.

In step 206, a speed of the measured object is determined according to a difference value between the coordinates of the measured object in the road extending direction and the time interval, wherein the coordinates of the measured object are acquired from two frames of the point cloud data spaced by the predetermined number of frames.

In this way, the three-dimensional point cloud data can be converted into two-dimensional point cloud data for the clustering processing, which improves clustering accuracy and thereby improves the accuracy of identification of the measured object. The point cloud areas can be screened to delete those point cloud areas which do not match with the morphological characteristics of the measured object, thus the interference due to the non-target objects is reduced and the accuracy of identification of the measured object is further improved. The coordinates of the measured object in the road extending direction can be determined based on the coordinates of the two-dimensional point cloud area in the road extending direction, which reduces the error rate of determining the coordinates of the object and improves the accuracy of determining the position of the object. In addition, since a plurality of point cloud areas can be obtained by the processing of clustering and screening, the speed detection for a plurality of measured objects can be realized, thus the speed measurement capability of the laser velocimeter can be improved and the number of the devices can be reduced.

Figure 3:
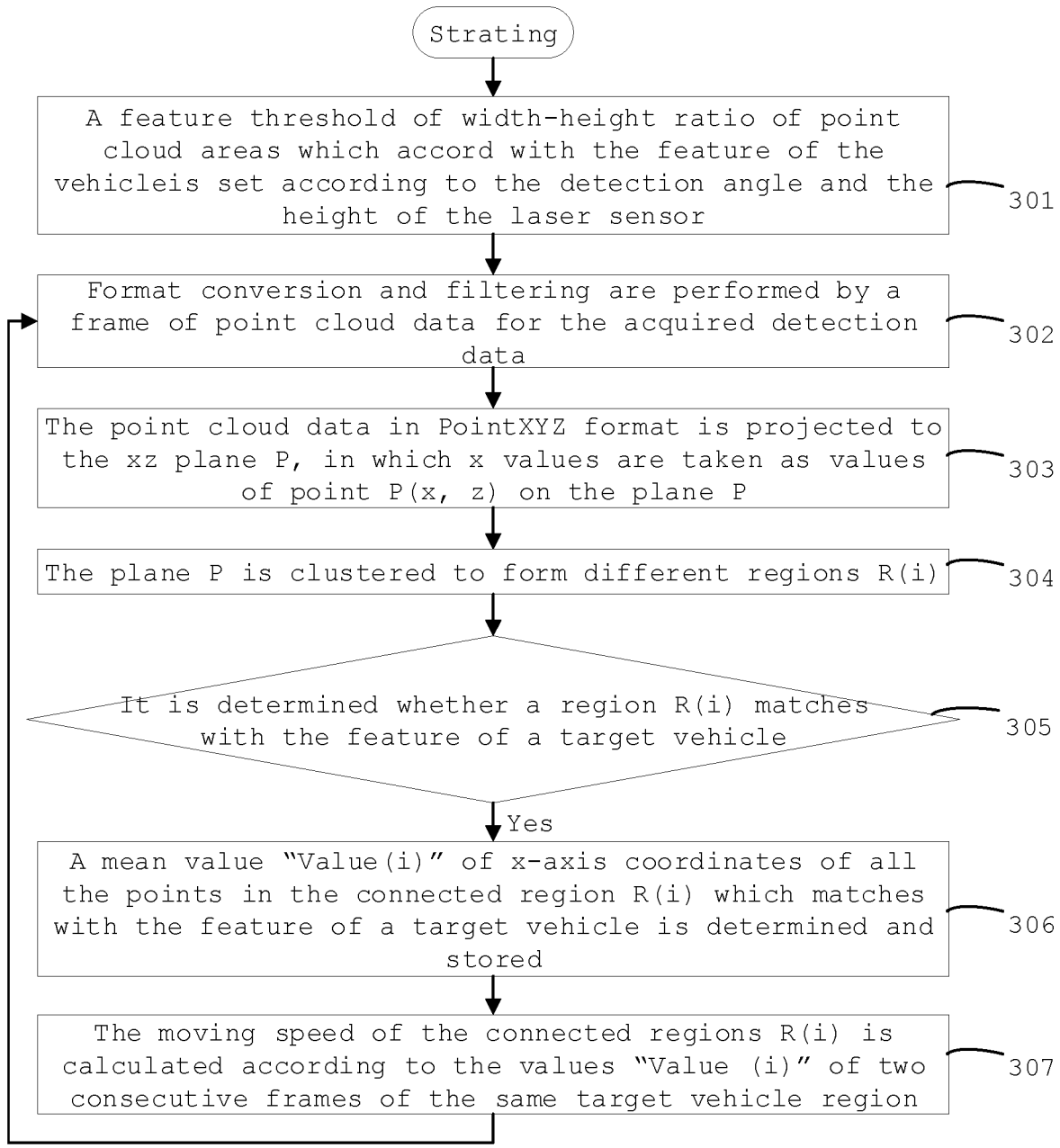
FIG. 3 is a flowchart showing still other embodiments of a laser speed measuring method of the present disclosure.

For a scenario applied to the vehicle speed detection, a flowchart of still other embodiments of the laser speed measuring method of the present disclosure is shown in FIG. 3.

In step 301, a feature threshold of width-height ratio of point cloud areas which accord with the feature of the vehicle is set according to the detection angle and the height of the laser sensor. In some embodiments, a width-to-height ratio range of point cloud area of the predetermined measured object is set as in step 203 above.

In step 302, format conversion and filtering are performed by a frame of point cloud data for the acquired detection data. In some embodiments, PCL (Point Cloud Library) technology may be utilized to convert PCLPointCloud2 format into Point XYZ format. In some embodiments, in order to reduce the influence of noise, the detection data may be filtered to remove obvious noise data (e.g., island data with a sharp change in depth). In some other embodiments, the background noise can be eliminated according to the device characteristics and environmental characteristics.

In step 303, the point cloud data in Point XYZ format is projected to the xz plane P, in which x values are taken as values of point P(x, z) on the plane P. In some embodiments, the xz plane may be the vertical plane along the road extending direction, the x-axis is along the road extending direction, and the coordinate of x-axis is taken as the value "Value" of the corresponding point P(x, z).

In step 304, the plane P is clustered to form different regions R(i), i=1~the number of regions obtained by clustering.

In step 305, it is determined whether a region R(i) matches with the feature of a target vehicle. If yes, go to step 306; if no, it means that there is no a target vehicle in current detection area, so the current process is end and the process is performed to the next frame of data.

In step 306, a mean value "Value(i)" of x-axis coordinates of all the points in the connected region R(i) which matches with the feature of a target vehicle is determined and stored.

In step 307, steps 302 to 306 are repeatedly performed to obtain the values "Value(i)" of two consecutive frames of data. The moving speed of the connected regions R(i) is calculated according to the values "Value (i)" of two consecutive frames of the same target vehicle region, i.e. the moving speed of the target vehicle. For example, if the mean value of the previous frame is Value1(i) and the mean value of the next frame is Value2(i), the speed V(i)=(Value1(i)−Value2(i))/Δt, wherein, Δt is the time interval between the two frames.

In this way, a target vehicle and a non-target vehicle can be effectively distinguished, and the position and speed information of the vehicle can be accurately acquired without being influenced by the side contour of the target vehicle.

Figure 4:
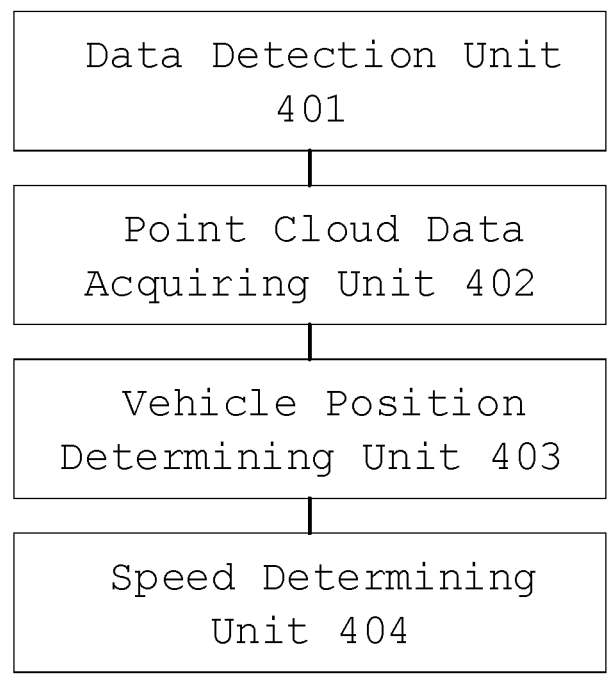
FIG. 4 is a schematic diagram showing some embodiments of a laser speed measuring control device of the present disclosure.

A schematic diagram of some embodiments of the laser speed measuring control device of the present disclosure is shown in FIG. 4. The data detection unit 401 can acquire the detection data within a predetermined detection angle range in a plurality of paralleled horizontal planes with different heights from a plurality of laser rays detected in towards a road extending direction.

The point cloud data acquiring unit 402 can acquire the three-dimensional point cloud data according to the detection data. In some embodiments, three-dimensional coordinates of each point within the detection angle range may be obtained according to the detection height, the laser detection angle and the detected depth information, thereby obtaining the three-dimensional point cloud data.

The vehicle position determining unit 403 can determine a position of the measured object in the road extending direction according to the three-dimensional point cloud data. In some embodiments, the measured object may be identified according to the three-dimensional point cloud data, thereby obtaining the position of the measured object in the road extending direction.

The speed determining unit 404 can determine a speed of the measured object is determined according to the position change of the measured object along the road extending direction at different timing. In some embodiments, the speed of the measured object may be determined based on the difference of position coordinates along the road extending direction and the time interval, wherein the difference of position coordinates derives from two frames of three-dimensional point cloud data, in which a predefined number of frames spaced between the two frames correspond to the time interval, wherein each time the laser detector completes scanning within the detection angle range, one frame of detection data is generated. In some embodiments, in order to prevent the detection angle of the object from changing greatly due to too fast moving speed of the measured object, a predetermined number may be set as zero, and the two frames of point cloud data spaced by the predetermined number of frames are the two frames of point cloud data corresponding to two consecutive frames, thus the accuracy of speed detection is improved and the real-time speed is facilitated to be acquired.

Such a laser speed measuring control device can obtain the three-dimensional point cloud data within a detection range based on the detection data obtained by a plurality of laser detectors. The interference caused by a contour change of the object or appearance of a non-target object is avoided by obtaining the position of the measured object from identifying and processing of the three-dimensional point cloud data and by determining the speed of the measured object based on multiple frames of detection data, thus the accuracy of the laser speed measurement is improved.

Figure 5:
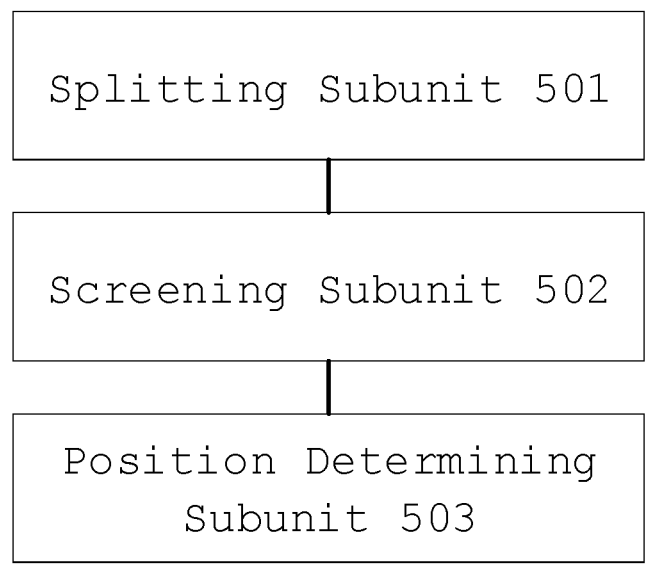
FIG. 5 is a schematic diagram showing some embodiments of a vehicle position determining unit in the laser speed measuring control device of the present disclosure.

A schematic diagram of some embodiments of the vehicle position determining unit in the laser speed measuring control device of the present disclosure is shown in FIG. 5. The vehicle position determination unit comprises a splitting subunit 501, a screening subunit 502 and a position determining subunit 503.

The splitting subunit 501 can split the three-dimensional point cloud data into a plurality of areas based on a clustering algorithm to acquire point cloud areas. In some embodiments, from the three-dimensional point cloud data, coordinate values along the road extending direction and the height direction perpendicular to the horizontal plane are acquired as coordinates of two-dimensional point clouds, and then the coordinate values along the road direction may be acquired as values of points corresponding to the two-dimensional point clouds and the two-dimensional point clouds and the values of points corresponding to the two-dimensional point clouds are clustered to acquire point cloud areas.

The screening subunit 502 screens the point cloud areas according to morphological characteristics of a predetermined measured object to acquire a point cloud area which accords with the morphological characteristics of the measured object. In some embodiments, the morphological characteristics may include at least one of a width-to-height ratio, a width and a height of the point cloud area.

The position determining subunit 503 can determine a position, in the road extending direction, of the point cloud area screened in the screening subunit 502. The coordinate of the point cloud area in the road extending direction may be a mean value of the coordinates of each point in the point cloud area in the road extending direction. In some other embodiments, characteristic points may be extracted from the point cloud area, and then the coordinates of the characteristic points in the road extending direction may be taken as the coordinates of the measured object in the road extending direction.

Such a laser speed measuring control device can convert the three-dimensional point cloud data into two-dimensional point cloud data for the clustering processing, which improves clustering accuracy and thereby improves the accuracy of identification of the measured object. The point cloud areas can be screened to delete those point cloud areas which do not match with the morphological characteristics of the measured object, thus the interference due to the non-target objects is reduced and the accuracy of identification of the measured object is further improved. The coordinates of the measured object in the road extending direction can be determined based on the coordinates of the two-dimensional point cloud area in the road extending direction, which reduces the error rate of determining the coordinates of the object and improves the accuracy of determining the position of the object.

Figure 6:
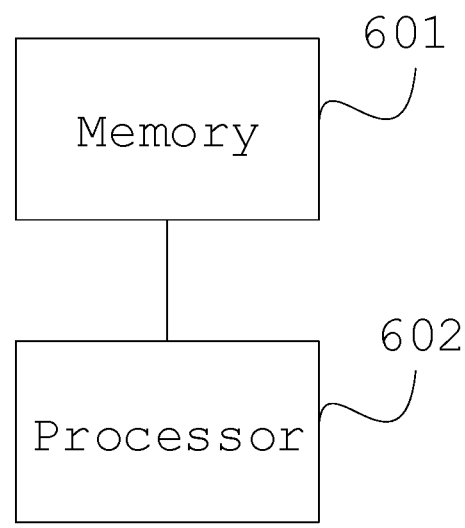
FIG. 6 is a schematic diagram showing some other embodiments of a laser speed measuring control device of the present disclosure.
Figure 7:
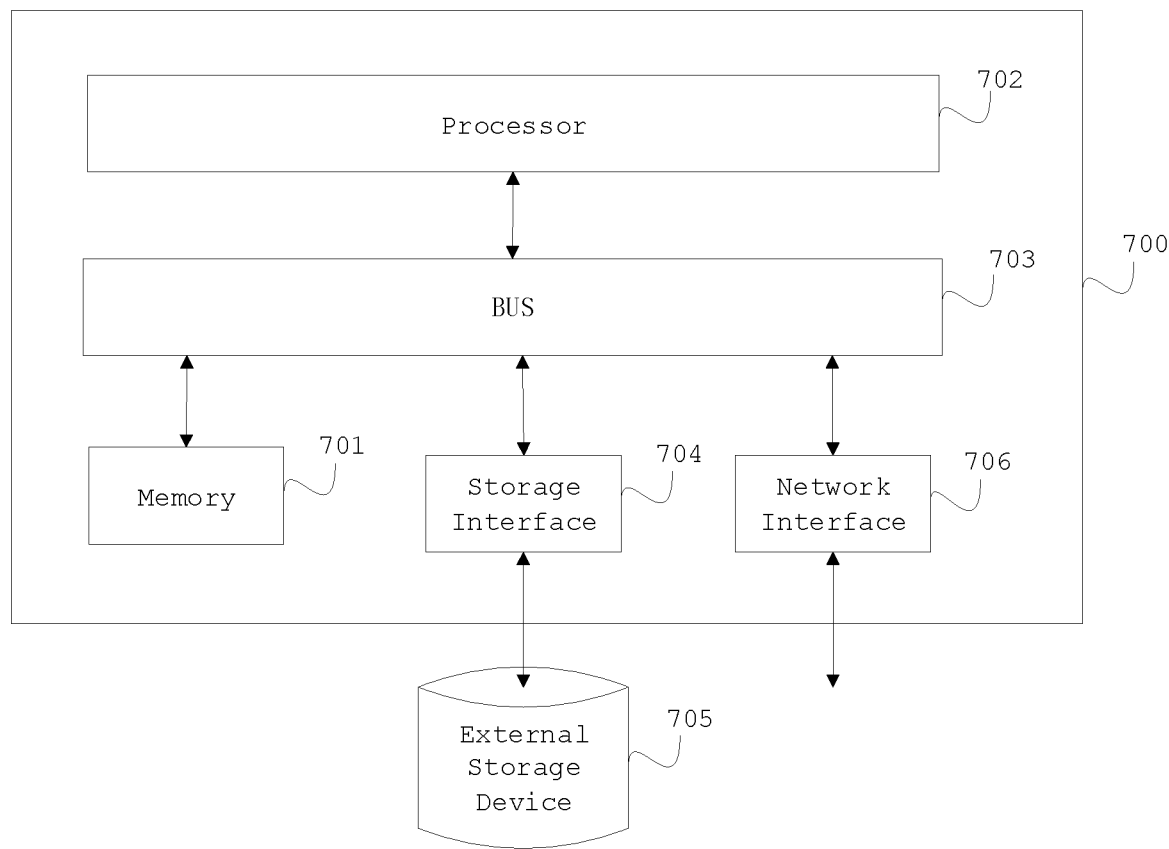
FIG. 7 is a schematic diagram showing still other embodiments of a laser speed measuring control device of the present disclosure.

In some embodiments, since the laser speed measuring control device can obtain a plurality of point cloud areas by the clustering and screening process in the vehicle position determination unit, the speed detection for a plurality of measured objects can be realized, thus the speed measurement capability of the laser velocimeter can be improved and the number of the devices can be reduced. A schematic structural diagram of some embodiments of the laser speed measuring control device of the present disclosure is shown in FIG. 6. The laser speed measuring control device comprises a memory 601 and a processor 602, wherein the memory 601 may be a magnetic disk, flash memory, or any other non-volatile storage medium. The memory is used for storing instructions in corresponding embodiments of the laser speed measuring method above. The processor 602 is coupled to the memory 601 and may be implemented as one or more integrated circuits, such as a microprocessor or microcontroller. The processor 602 is configured to execute instructions stored in the memory, so as to avoid the interference caused by a contour change of the object or appearance of a non-target object and to improve the accuracy of the laser speed measurement In some embodiments, as also shown in FIG. 7, the laser speed measuring control device 700 comprises a memory 701 and a processor 702. The processor 702 is coupled to the memory 701 through a bus 703. The laser speed measuring control device 700 can also be connected to an external storage device 705 through a storage interface 704 for calling external data, and can also be connected to a network or another computer system (not shown) through a network interface 706, which will not be described in detail herein.

In the embodiment, the interference caused by a contour change of the object or appearance of a non-target object can be avoided by storing the data instructions in the memory and processing the instructions by the processor, and the accuracy of laser speed measurement can be improved.

In further embodiments, a computer-readable storage medium has stored thereon computer program instructions which, when executed by a processor, implement the steps of the method in the corresponding embodiments of the laser speed measuring method. As will be appreciated by those skilled in the art, the embodiments of the present disclosure may be provided as a method, device, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer available non-transitory storage media (including, but not limited to, disk storage, CD-ROM, optical storage, and so forth) containing computer available program codes.

Figure 8:
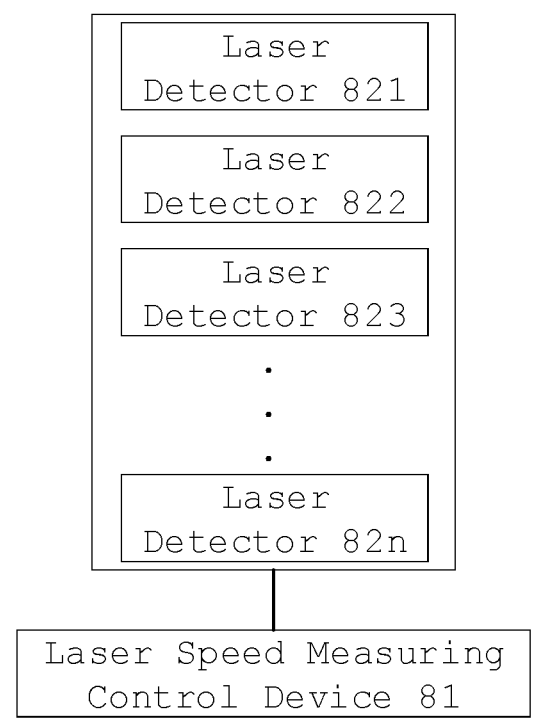
FIG. 8 is a schematic diagram showing some embodiments of a laser velocimeter of the present disclosure.

A schematic diagram of some embodiments of the laser velocimeter of the present disclosure is shown in FIG. 8. The laser speed measuring control device 81 can be any one of the above mentioned devices. The laser detectors 821-82$n$ may be installed respectively on the base at fixed heights, and arranged linearly in the vertical direction. The base is paralleled to the passage through which the measured object passes, and its distance from the track is fixed. For instance, disposing the laser detectors 821-82$n$ by one side of the road, and detecting speeds of vehicles in directions of approaching and distancing. The orientation of each laser detector is equivalent and the detected angle range is equivalent. In some embodiments, the individual laser detectors are set to be synchronized, thereby improving the accuracy of the point cloud data. In some embodiments, multi-layer laser radar can be adopted to obtain three-dimensional laser detection data, thereby obtaining three-dimensional point cloud to simplify the intricacies of installing the devices, which is beneficial to improve the flexibility of installment and promote the application of this technology.

The laser velocimeter can utilize the detection data obtained by multiple laser detectors to obtain the three-dimensional point cloud data of the detection area, then obtaining the position of the measured object through screening and processing of the three-dimensional point cloud data, thereby deriving the speed of the measured object based on the data in multiple frames. This laser velocimeter is effective in avoiding the interference caused by the change of the object contour or the appearance of non-targets, and improving the accuracy of the laser speed measurement.

The present disclosure is described with reference to flowcharts and/or block diagrams of methods, devices (systems) and computer program products according to the embodiments of the present disclosure. It will be understood that each flow and/or block in the flowchart and/or block diagram, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus to produce a machine, such that the instructions, which are executed by the processor of the computer or other programmable data processing apparatuses, generate means for implementing the functions specified in one or more flows of the flowchart and/or one or more blocks in the block diagram.

These computer program instructions may also be stored in a computer-readable memory that can direct a computer or other programmable data processing apparatuses to function in a particular manner, such that the instructions stored in the computer-readable memory produce an article of manufacture including instruction means which implement the functions specified in one or more flows of the flowchart and/or one or more blocks in the block diagram.

These computer program instructions may also be loaded onto a computer or other programmable data processing apparatuses to cause a series of operational steps to be performed on the computer or other programmable apparatuses to produce a computer-implemented process such that the instructions which are executed on the computer or other programmable apparatuses provide steps for implementing the functions specified in one or more flows of the flowcharts and/or one or more blocks in the block diagrams.

Thus far, the present disclosure has been described in detail. Some details well known in the art have not been described in order to avoid obscuring the concepts of the present disclosure. Those skilled in the art can now fully appreciate how to implement the teachings disclosed herein, in view of the foregoing description.

The methods and device of the present disclosure may be implemented in a number of ways. For example, the method and device of the present disclosure may be implemented by software, hardware, firmware, or any combination of software, hardware, and firmware. The above-described order for the steps of the method is for illustration only, and the steps of the method of the present disclosure are not limited to the order specifically described above unless specifically stated otherwise. Further, in some embodiments, the present disclosure may also be embodied as programs recorded in a recording medium, the programs including machine-readable instructions for implementing the method according to the present disclosure. Thus, the present disclosure also covers a recording medium storing a program for executing the method according to the present disclosure.

Finally, it should be noted that: the above examples are intended only to illustrate the technical solutions of the present disclosure and not to limit it; although the present disclosure has been described in detail with reference to embodiments, those of ordinary skill in the art will understand that: modifications to the specific embodiments of the disclosure or equivalent substitutions for parts of the technical features may be made without departing from the spirit of the technical solutions of the present application, and all of these are intended to be covered by the scope of the technical solutions as claimed in this disclosure.

The invention claimed is:

1. A laser speed measuring method, comprising the steps of:
   acquiring detection data within a predetermined detention angle range in a plurality of paralleled horizontal planes having different heights, from a plurality of laser rays detected towards a road extending direction in the horizontal plane;
   acquiring three-dimensional point cloud data according to the detection data;
   determining a position of a measured object in the road extending direction according to the three-dimensional point cloud data; and
   determining a speed of the measured object according to the position change of the measured object along the road extending direction at different timing, comprising:
   acquiring a time interval generated from two frames of detection data spaced by a predetermined number of frames; and
   determining a speed of the measured object according to a difference value between the coordinates of the measured object in the road extending direction and the time interval, wherein the coordinates of the measured object are acquired from two frames of the detection data spaced by the predetermined number of frames.

2. The method according to claim 1, wherein the step of obtaining a position of a measured object in the road extending direction according to the three-dimensional point cloud data comprises:
   splitting the three-dimensional point cloud data into areas based on a clustering algorithm to acquire point cloud areas;
   screening the point cloud areas according to morphological characteristics of a predetermined measured object for a point cloud area which matches with the morphological characteristics of the measured object; and
   determining a position of the screened point cloud area in the road extending direction.

3. The method according to claim 2, wherein the step of splitting the three-dimensional point cloud data into areas based on a clustering algorithm comprises:

acquiring coordinate values in the road extending direction and the vertical direction perpendicular to the horizontal plane as coordinates of two-dimensional point clouds from the three-dimensional point cloud data;

acquiring the coordinate values in the road direction of the three-dimensional point cloud data as values of point corresponding to the two-dimensional point clouds; and clustering the two-dimensional point clouds and the values of points corresponding to the two-dimensional point clouds to acquire point cloud areas.

4. The method according to claim 2, wherein the step of screening the point cloud areas according to morphological characteristics of a predetermined measured object comprises:

acquiring a width-to-height ratio of the point cloud area to determine whether or not the width-to-height ratio of the point cloud area is within a width-to-height ratio range of the point cloud area of the predetermined measured object, wherein the width-to-height ratio range of the point cloud area of the predetermined measured object is determined according to a width-to-height ratio of the measured object, a placement height of the laser detector and a ray emission density of the laser detector;

acquiring width/height information and depth information of the point cloud area;

judging whether or not the width of the point cloud area is within a width range of the measured object at a current depth, wherein the width range of the measured object at the current depth is determined according to the predetermined width range and depth information of the measured object; and/or judging whether or not the height of the point cloud area is within a height range of the measured object at a current depth, wherein the height range of the measured object at the current depth is determined according to the predetermined height range and depth information of the measured object; and determining that the point cloud area matches with the morphological characteristics of the measured object if it is judged that the width or height of the point cloud area is within the width or height range of the measured object at the current width or depth.

5. The method according to claim 2, wherein the step of determining a position of the screened point cloud area in the road extending direction comprises:

acquiring a mean value of the coordinates of all point clouds in the point cloud area in the road extending direction; or acquiring the coordinates of the characteristic points in the road extending direction, wherein the characteristic points are extracted from the point cloud area and comprise at least one of a center of the point cloud area, a gravity center of the point cloud area, or an n-th point cloud from a position on the predetermined edge of the point cloud area of the point cloud data of the measured object towards a center direction, where n is a positive integer.

6. The method according to claim 1, wherein the two frames of detection data spaced by the predetermined number of frames are two consecutive frames of detection data in a case that the predetermined number is set as zero.

7. A computer-readable storage medium on which computer program instructions are stored, wherein the instructions, when executed by a processor, implement the steps of the method according to claim 1.

8. A laser speed measuring control device, comprising:

a data detection unit configured to acquire detection data within a predetermined detection angle range in a plurality of paralleled horizontal planes having different heights, from a plurality of laser rays detected towards a road extending direction in the horizontal plane;

a point cloud data acquiring unit configured to acquire three-dimensional point cloud data according to the detection data;

a vehicle position determining unit configured to determine a position of a measured object in the road extending direction according to the three-dimensional point cloud data; and a speed determining unit configured to determine a speed of the measured object according to the position change of the measured object along the road extending direction at different timing, comprising:

acquiring a time interval generated from two frames of detection data spaced by a predetermined number of frames; and determining a speed of the measured object according to a difference value between the coordinates of the measured object in the road extending direction and the time interval, wherein the coordinates of the measured object are acquired from two frames of the detection data spaced by the predetermined number of frames.

9. The laser speed measuring control device according to claim 8, wherein the vehicle position determining unit comprises:

a splitting subunit configured to split the three-dimensional point cloud data into areas based on a clustering algorithm to acquire point cloud areas;

a screening subunit configured to screen the point cloud areas according to morphological characteristics of a predetermined measured object for a point cloud area which matches with the morphological characteristics of the measured object; and a position determining subunit configured to determine determining a position of the screened point cloud area in the road extending direction.

10. A laser speed measuring control device, comprising:
a memory; and
a processor couples to the memory, the processor configure to perform following steps of;

acquiring detection data within a predetermined detention angle range in a plurality of paralleled horizontal planes having different heights, from a plurality of laser rays detected towards a road extending direction in the horizontal plane;

acquiring three-dimensional point cloud data according to the detection data;

determining a position of a measured object in the road extending direction according to the three-dimensional point cloud data; and determining a speed of the measured object according to the position change of the measured object along the road extending direction at different timing, comprising:

acquiring a time interval generated from two frames of detection data spaced by a predetermined number of frames; and determining a speed of the measured object according to a difference value between the coordinates of the measured object in the road extending direction and the time interval, wherein the coordinates of the measured object are acquired from two frames of the detection data spaced by the predetermined number of frames.

11. The laser speed measuring control device according to claim 10, wherein the step of obtaining a position of a measured object in the road extending direction according to the three-dimensional point cloud data comprises:
   splitting the three-dimensional point cloud data into areas based on a clustering algorithm to acquire point cloud areas;
   screening the point cloud areas according to morphological characteristics of a predetermined measured object for a point cloud area which matches with the morphological characteristics of the measured object; and
   determining a position of the screened point cloud area in the road extending direction.

12. The laser speed measuring control device according to claim 11, wherein the step of splitting the three-dimensional point cloud data into areas based on a clustering algorithm comprises:
   acquiring coordinate values in the road extending direction and the vertical direction perpendicular to the horizontal plane as coordinates of two-dimensional point clouds from the three-dimensional point cloud data;
   acquiring the coordinate values in the road direction of the three-dimensional point cloud data as values of point corresponding to the two-dimensional point clouds; and
   clustering the two-dimensional point clouds and the values of points corresponding to the two-dimensional point clouds to acquire point cloud areas.

13. The laser speed measuring control device according to claim 11, wherein the step of screening the point cloud areas according to morphological characteristics of a predetermined measured object comprises:
   acquiring a width-to-height ratio of the point cloud area to determine whether or not the width-to-height ratio of the point cloud area is within a width-to-height ratio range of the point cloud area of the predetermined measured object, wherein the width-to-height ratio range of the point cloud area of the predetermined measured object is determined according to a width-to-height ratio of the measured object, a placement height of the laser detector and a ray emission density of the laser detector;
   acquiring width/height information and depth information of the point cloud area;
   judging whether or not the width of the point cloud area is within a width range of the measured object at a current depth, wherein the width range of the measured object at the current depth is determined according to a predetermined width range and depth information of the measured object; and/or
   judging whether or not the height of the point cloud area is within a height range of the measured object at a current depth, wherein the height range of the measured object at the current depth is determined according to a predetermined height range and depth information of the measured object; and
   determining that the point cloud area matches with the morphological characteristics of the measured object if it is judged that the width or height of the point cloud area is within the width or height range of the measured object at the current width or depth.

14. The laser speed measuring control device according to claim 10, wherein the step of determining a position of the screened point cloud area in the road extending direction comprises:
   acquiring a mean value of the coordinates of all point clouds in the point cloud area in the road extending direction; or
   acquiring the coordinates of the characteristic points in the road extending direction, wherein the characteristic points are extracted from the point cloud area and comprise at least one of a center of the point cloud area, a gravity center of the point cloud area, or an n-th point cloud from a position on the predetermined edge of the point cloud area of the point cloud data of the measured object towards a center direction, where n is a positive integer.

15. The laser speed measuring control device according to claim 10, wherein the processor is further configured to make the two frames of detection data spaced by the predetermined number of frames be two consecutive frames of detection data in a case that the predetermined number is set as zero.

16. A laser velocimeter comprising:
   a plurality of laser detectors disposed in vertical direction; and
   a laser speed measuring control device according to claim 10.

17. The laser velocimeter according to claim 16, wherein the plurality of laser detectors disposed in vertical direction are multi-layer laser radar.

* * * * *